April 24, 1934.　　　G. B. NICHOLS　　　1,956,131
APPARATUS FOR AND METHOD OF SHAPING TIRES AND INSERTING AIR BAGS THEREIN
Filed March 21, 1929　　　5 Sheets-Sheet 1
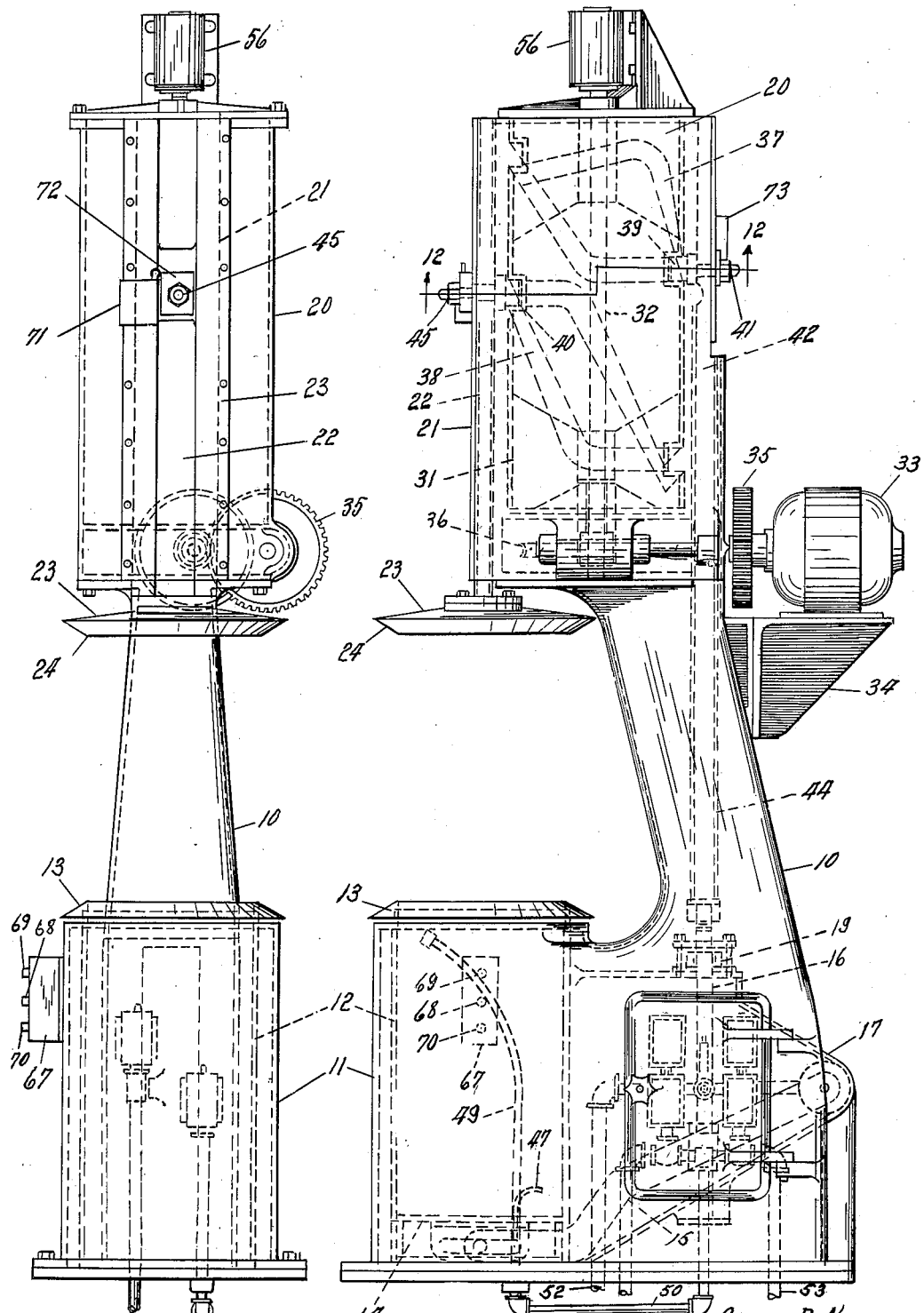
Fig.1.　　Fig.2.　　By GEORGE B. NICHOLS.
Ely & Barrow
ATTORNEYS.

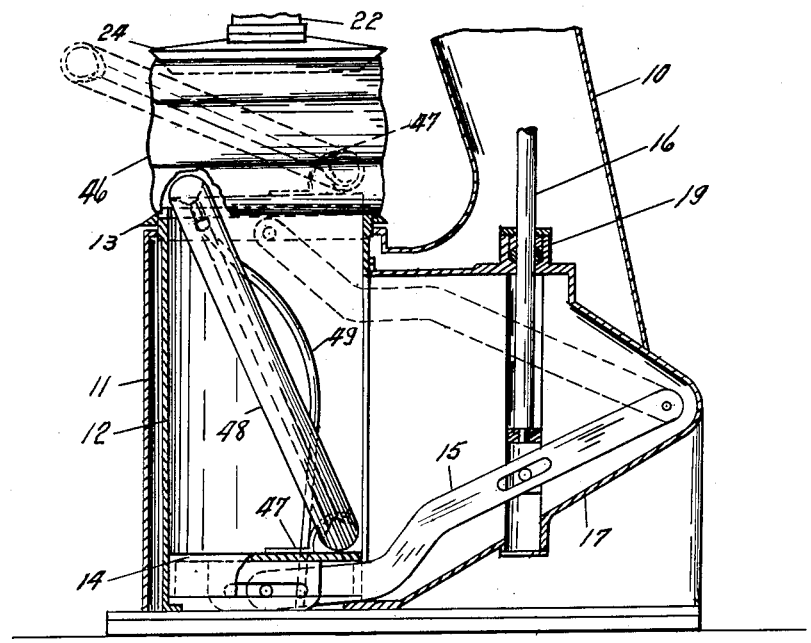
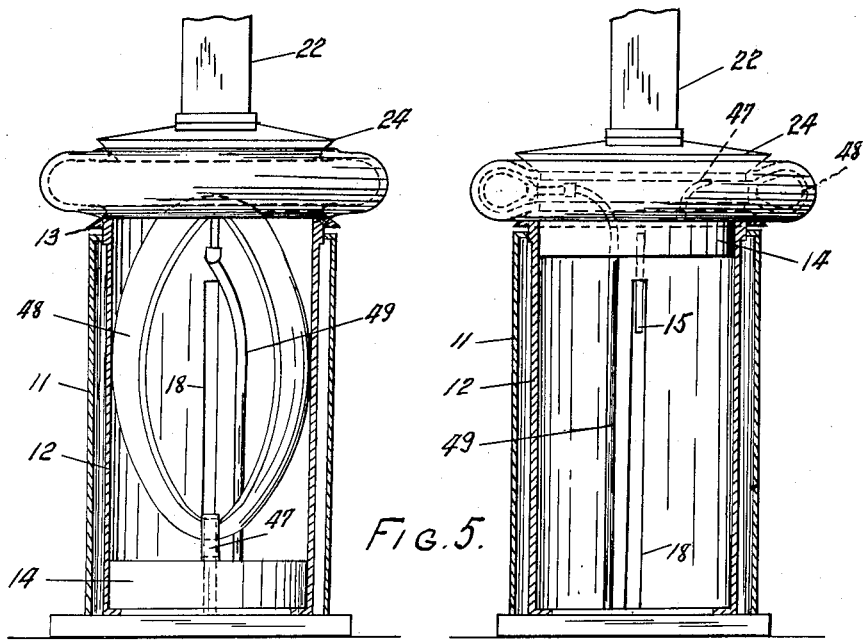

April 24, 1934. G. B. NICHOLS 1,956,131
APPARATUS FOR AND METHOD OF SHAPING TIRES AND INSERTING AIR BAGS THEREIN
Filed March 21, 1929 5 Sheets-Sheet 3
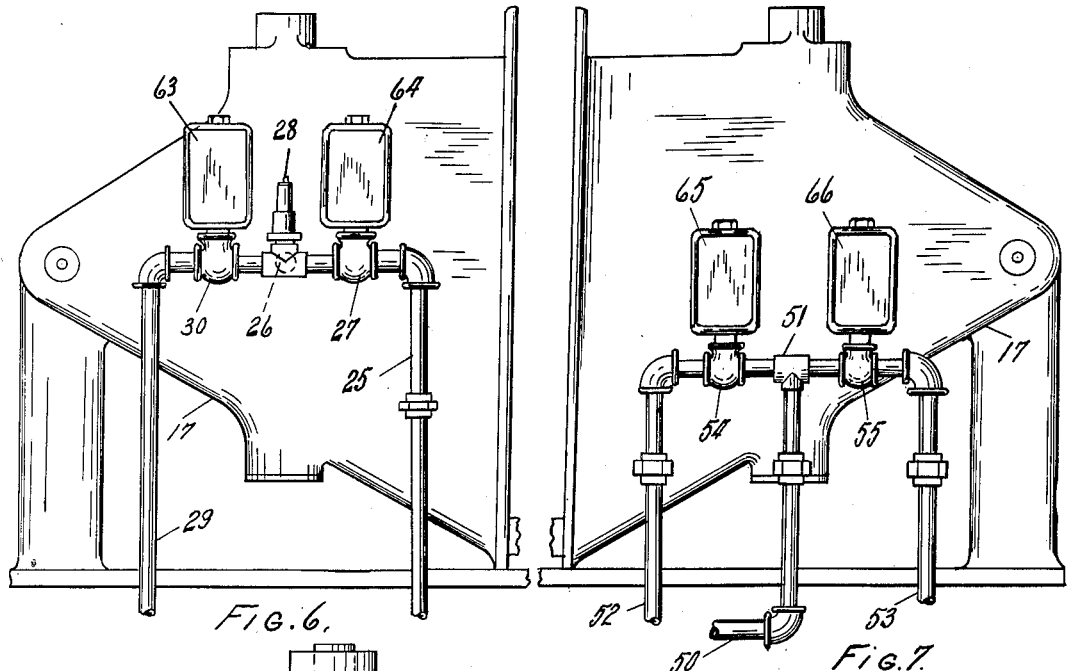
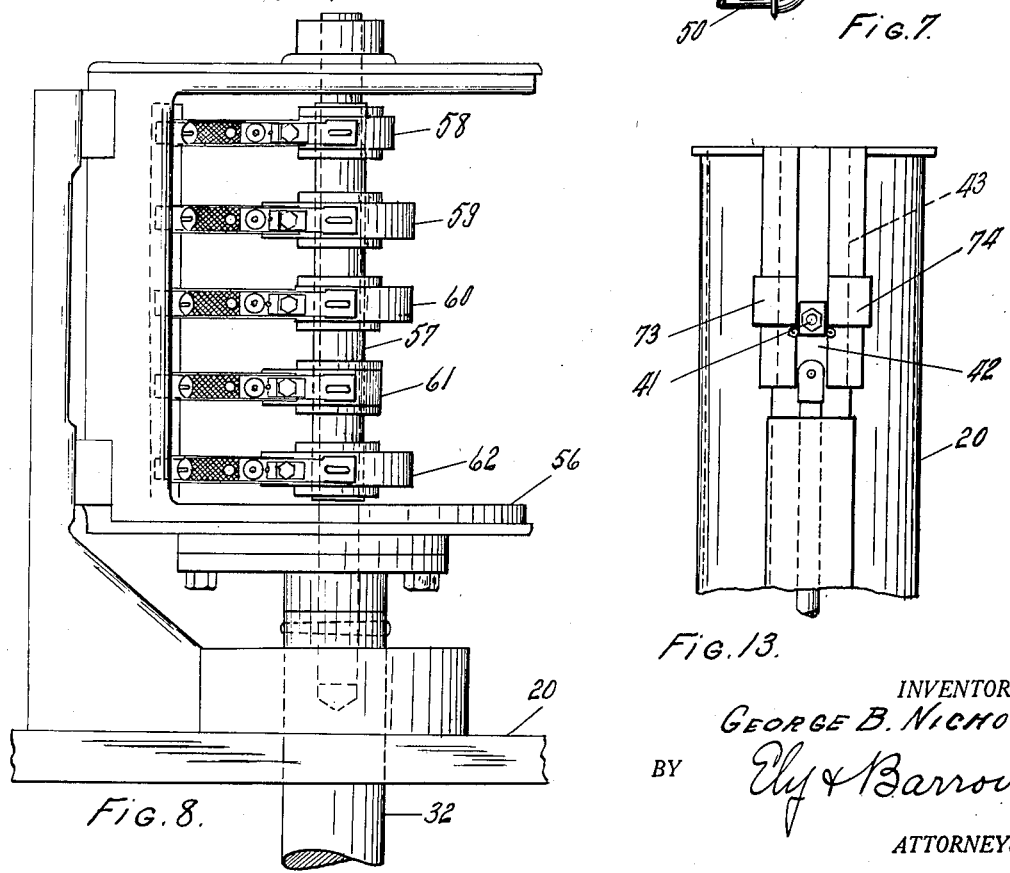
INVENTOR.
GEORGE B. NICHOLS.
BY Ely & Barrow
ATTORNEYS.

INVENTOR.
GEORGE B. NICHOLS.
BY Ely & Barrow
ATTORNEYS.

April 24, 1934.   G. B. NICHOLS   1,956,131
APPARATUS FOR AND METHOD OF SHAPING TIRES AND INSERTING AIR BAGS THEREIN
Filed March 21, 1929   5 Sheets-Sheet 5

INVENTOR.
GEORGE B. NICHOLS.
BY Ely & Barrow
ATTORNEYS.

Patented Apr. 24, 1934

1,956,131

UNITED STATES PATENT OFFICE 1,956,131

APPARATUS FOR AND METHOD OF SHAPING TIRES AND INSERTING AIR BAGS THEREIN

George B. Nichols, Akron, Ohio, assignor to The Firestone Tire & Rubber Company, Akron, Ohio, a corporation of Ohio Application March 21, 1929, Serial No. 348,768

45 Claims. (Cl. 18—2)

This invention relates to methods of and means for building pneumatic automobile tires. An object of the invention is to devise a method of shaping "drum-built" tire bands into tire form and inserting an air bag therein. A further object is to devise means for performing the steps of the tire shaping and air bag inserting process. The invention further contemplates a process and apparatus for inserting the air bag into a tire either with or without the tire-shaping operations.

The foregoing and other objects are obtained by the method and device illustrated in the accompanying drawings and described below. It is to be understood that the invention is not limited to the specific form thereof or method disclosed herein.

Of the accompanying drawings,

Figure 1 is a front elevation of a machine embodying the principles of the invention;

Figure 2 is a side elevation thereof;

Figures 3, 4 and 5 are elevational detail views partly in section and illustrating the positions of the machine, tire, and air bag in performing successive steps of the process;

Figure 6 is an enlarged scale elevational detail view of expander air valve mechanism;

Figure 7 is an elevational detail view of air bag valve mechanism;

Figure 8 is an enlarged scale side elevational detail of the electrical switch mechanism;

Figure 13 is a rear elevational detail of a portion of the apparatus;

Figure 9:
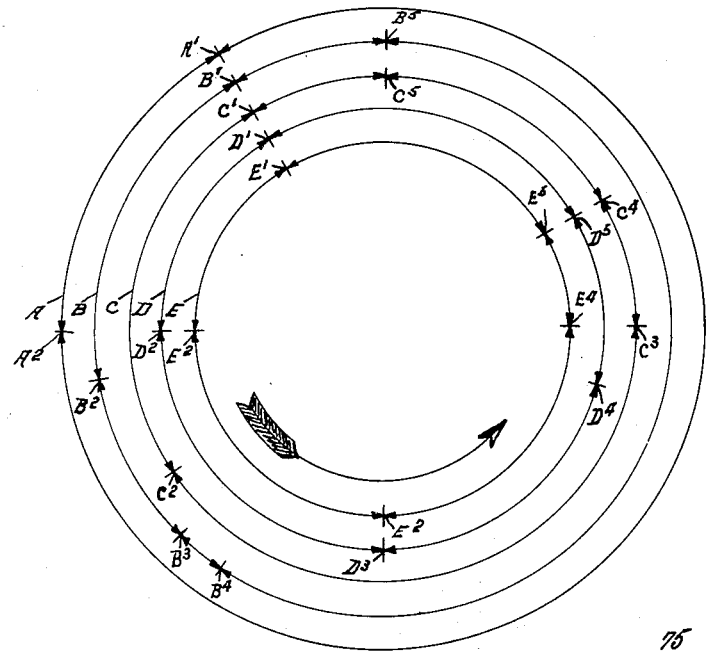
Figure 9 is a sequence diagram illustrating the cycles of the various machine operations.

Referring to the drawings, the numeral 10 denotes a frame affording a support for the various portions of the apparatus. The lower portion of the frame is provided with a well 11 in which is mounted a cylinder 12 open at the top and provided with a frusto-conical bevelled flange 13. A piston or ram 14 is reciprocable within the cylinder and is adapted to be actuated through a pivoted lever 15 by means of reciprocable rod 16. Lever 15 and rod 16 work within a casing 17 attached to cylinder 12 and connected thereto in an air-tight manner. Lever 15 swings up and down in a slot 18 through which cylinder 12 and casing 17 communicate. The packing gland 19 is positioned about the shaft 16 where it passes through casing 17 to maintain an air-tight joint at this point. A cylindrical housing 20 mounted on the top of frame 10 is provided on its front with a vertical track 21 in which a sliding beam or shaft 22 is adapted to reciprocate. To the lower end of beam 22 is attached a plate 23 having a frusto-conical bevelled flange 24 similar to flange 13 above which it is vertically positioned and toward and from which it is adapted to reciprocate.

Compressed air is admitted to casing 17 and cylinder 12 from supply line 25 through a port 26 and is controlled by a valve 27, best illustrated in Figure 6. A safety valve 28 prevents excessive pressure from building up in the cylinder, and exhaust from the cylinder and casing to exhaust line 29 is controlled by a valve 30, operating means for valves 27 and 30 being later described.

The foregoing essential elements of the invention may be actuated by the mechanism next to be described, but it will be understood that equivalent mechanism may be substituted for that specifically mentioned herein. A cam cylinder 31 has keyed thereto a shaft 32 journaled at its ends for rotation within housing 20. Driving means for cam 31 comprise a motor 33 supported on frame 10 by a bracket 34, and rotating shaft 32 through a train of reduction gears 35 and worm gear 36. Cam cylinder 31 is provided with an upper cam track 37 and a lower cam track 38 in which cam followers 39 and 40 are respectively adapted to travel. Follower 39 is journaled on a stud 41 passing through a slide 42 adapted to reciprocate within a track 43 formed on the rear of housing 20 as illustrated in Figures 2 and 13. Slide 42 is connected to shaft 16 by means of a rod 44 so that as follower 39 is raised and lowered in cam track 37, lever 15 and ram 14 will be correspondingly raised and lowered. Follower 40 is journaled on a stud 45 passing through slide 22, whereby as cam track 38 rotates past cam follower 40, the follower will travel up and down and slide 22 and plate 23 will be correspondingly raised and lowered for engagement with a drum-built tire band 46 mounted on flange 13. Ram 14 is provided with a hook member 47 for engagement with an air bag 48 to pull the same into cylinder 12 as ram 14 is lowered.

Air bag 48 may be evacuated and filled with compressed air or non-oxidizing gas during the carrying out of the process, if desired. For this purpose there is provided a flexible hose 49 connected by a conduit 50 and tee 51 to vacuum line 52 and gas line 53, the vacuum and gas being respectively controlled by valves 54 and 55 as illustrated in Figure 7.

Figure 15:
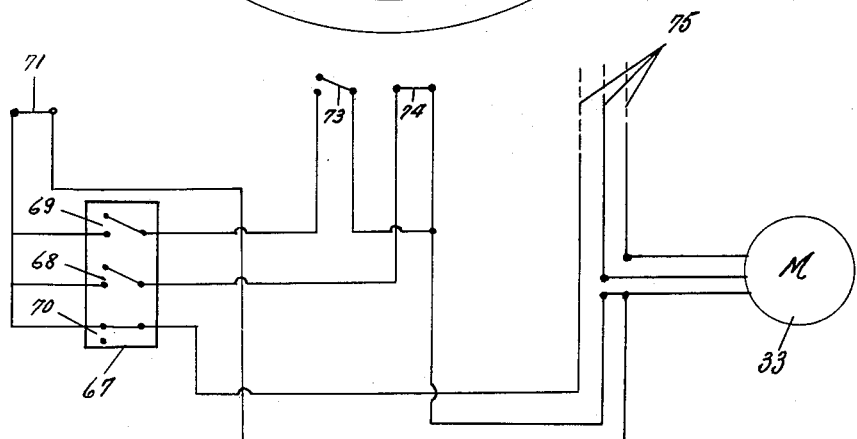
Figure 15 is a wiring diagram of the motor-operating circuits.
Figure 14:
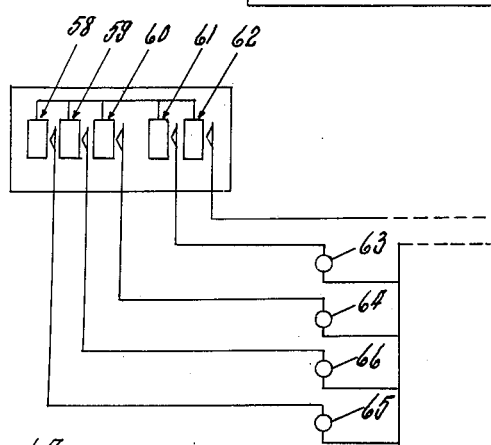
Figure 14 is a wiring diagram of the valve-actuating circuits.

The machine is made semi-automatic in operation by providing electrical valve-actuating means and limit switches for making and breaking the motor circuit. The valve-operating circuit is controlled by a timer 56 mounted on top of housing 20 and having its shaft 57 fixed to rotate with shaft 32 as shown in Figure 8. Shaft 57 is provided with vacuum valve control cam 58, gas valve control cam 59, air valve control cam 60, exhaust valve control cam 61, and a common circuit control 62. Cam followers engaging the above mentioned cams and electrical contacts and circuits (shown diagrammatically in Figure 14) are suitably arranged so that electrical energy switched on and off by operation of the circuit controlling cams, will energize solenoids 63, 64, 65 and 66 for respectively opening in proper timed relation and sequence, valves 30, 27, 54 and 55. Manual control of motor 33 is afforded by switch 67 comprising a button 68 for switching on motor 33 to pull air bag 48 into cylinder 12, a button 69 to start the motor for the balance of the operations, and a button 70 to stop motor 33 at any point. Automatic control of motor 33 is accomplished by normally closed limit switch 71 mounted adjacent track 21 to be engaged by an abutment 72, and normally open limit switch 73 and normally closed limit switch 74 mounted on the rear of housing 20 and adapted to be operated by slide 42. The wiring diagram illustrated in Figure 15 shows the manner of connecting motor 33 with the power lines 75 through push button switches 68, 69 and 70, and limit switches 71, 73 and 74.

In carrying out the method of the invention, the beads of the drum-built tire band are forced toward each other while compressed air exerts an outward force against the inner surfaces thereof, thus shaping the band into tire form. The foregoing steps are carried out while an air bag is held below the tire band in a plane diagonally of the central plane of the tire. After the band has been shaped to tire form the air bag is forced within the band starting at one side of the bag and continuing until the bag is completely inserted within the tire band. During the insertion of the air bag the latter may be evacuated and inflated with a non-oxidizing gas.

In the operation of the apparatus disclosed herein for carrying out the above method of the invention, as ram 14 is at its upper position, an air bag is engaged with hook 47 as shown in dotted lines in Figure 3 and hose 49 is connected to the air bag. Button 68 is then held in establishing the motor circuit, whereupon motor 33 will rotate cam cylinder 31 until ram 14 is dropped to full line position shown in Figure 3, at which point limit switch 74 will be opened to stop the motor and limit switch 73 will be closed. The air bag then takes the full line position shown in Figures 3 and 4, being bowed into an elliptical shape and being disposed in a plane diagonally of the plane of the top of cylinder 12. A drum-built tire band 46 is then placed upon flange 13 with its lower bead in engagement with the bevelled surface of the flange, and push button 69 pressed in to establish the motor circuit through the closed switch 73 to again start the motor. By rotation of cam cylinder 31 cam track 38 next causes slide 22 to descend permitting limit switch 71 to close, establishing the motor circuit through this switch instead of through push button 69.

The downward motion of slide 22 causes plate 23 to be lowered to engage bevelled flange 24 with the upper bead of the tire band. Plate 23 continues to descend forcing the beads of the tire band toward each other, during which time compressed air is admitted to cylinder 12 and the pressure building up within the tire band at the same time that the beads are being forced together, forms the band into tire shape as shown in Figure 4. By continued rotation of cylinder 31, cam track 37 next raises ram 14 forcing the air bag into the shaped tire band as shown in Figure 5. Ram 14 and plate 23 are then given a slight further thrust toward each other for finally positioning the air bag within the tire band. During the inserting of the air bag, the latter may be evacuated and inflated with a non-oxidizing gas under pressure. Further rotation of cylinder 31 completes the cycle by raising plate 23 until abutment 72 engages switch 71 to stop the motor. Hose 49 may then be disconnected from the air bag and the tire and air bag removed from the machine, the latter being then ready to begin again on its next operation.

Figure 11:
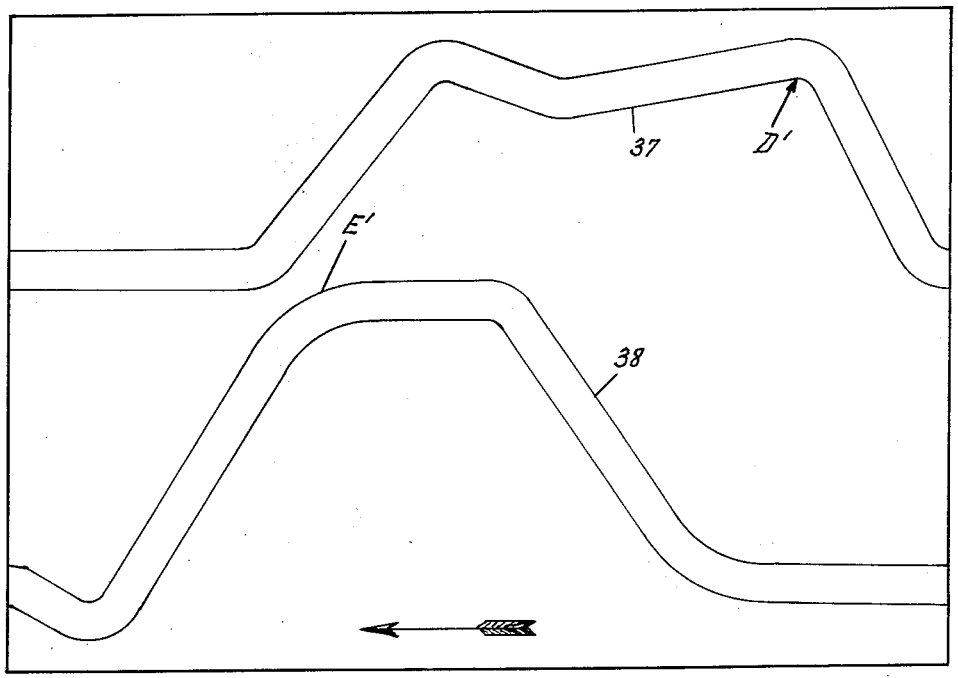
Figure 11 is a flat layout thereof.
Figures 10, 12:
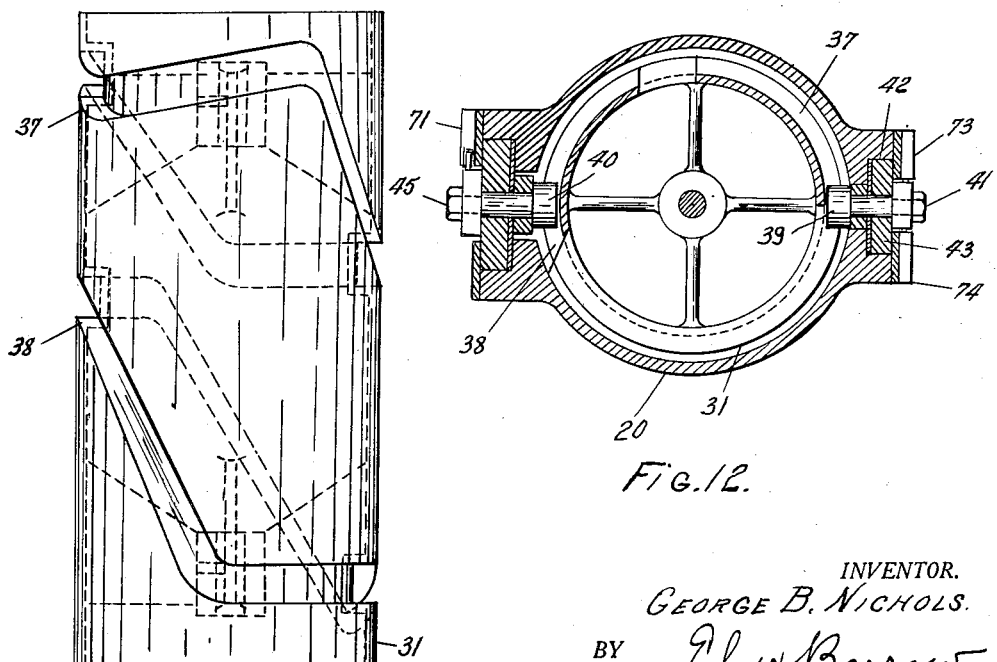
Figure 10 is an enlarged scale elevational detail of the operating cam.
Figure 12 is a transverse section taken on the line 12—12 of Figure 2.

Figure 9 illustrates diagrammatically the sequence of the cycles of the various machine operations and the time relation of the cycles to each other. Of the cycles shown in the diagram, A is the motor control cycle, B is the air bag valve cycle, C is the expander air valve cycle, D is the air bag ram cycle, and E is the cycle of motion of plate 23. Since all of the cycles are timed by the rotation of cam cylinder 31 each cycle is completed in the same time. A flat layout of the cam cylinder is shown in Figure 11 to illustrate the relative courses of cam tracks 37 and 38. The operation as described above starts with the cam follower 40 at point $E^1$ and cam follower 39 at point $D^1$.

On the sequence diagram, Figure 9, $A^1$ is the starting point of the operation as above described. At this point push button 68 is held in to run the motor until the cam rotates to point $A^2$ on the diagram where automatic cutout switch 74 stops the motor. Push button 69 is then pressed and the motor continues to drive the cam until point $A^1$ is reached again where automatic cutout switch 71 stops the motor, completing the cycle. In the air bag valve cycle the cam moves from point $B^1$ to $B^2$ where the vacuum valve 54 is opened; at point $B^3$ the vacuum valve is closed; at point $B^4$ gas valve 55 is opened; at point $B^5$ the gas valve is closed; and at point $B^1$ the cycle is completed. In the expander air valve cycle the cam moves from point $C^1$ to $C^2$ where air valve 27 is opened; at point $C^3$ the air valve is closed; at point $C^4$ exhaust valve 30 is opened; at point $C^5$ the exhaust valve is closed; and at point $C^1$ the cycle is completed. In the air bag ram cycle the ram 14 starts at point $D^1$ and descends until point $D^2$ is reached. The ram is then held to point $D^3$ where it rises to point $D^4$, then is lowered to point $D^5$ and rises again to point $D^1$ the end of the cycle. In the cycle of motion of plate 23 beginning at point $E^1$ the plate is held until point $E^2$ is reached where it is forced down to point $E^3$. Plate 23 is then held still to point $E^4$, then is further slightly lowered to point $E^5$ where it rises to point $E^1$ completing the cycle. The relationship to each other of the various valve operations, and tire and air bag operations with respect to each other is thus graphically shown. The angles shown in Figure 9 are merely for illustrative purposes and these angles and the corresponding timing of the operations may be varied as desired to produce the most efficient results.

Insofar as the apparatus and method of insertion of the air bag is concerned, this operation may be performed in conjunction with the specific tire-shaping operations described, or it may be performed upon a previously shaped tire placed in proper relation to the bag-inserting mechanism. Other specific means may be provided for shaping the tire, it being essential only that a tire be in position and approximately in tire shape so as to receive the air bag when it is projected from the cylinder or well in which it is held.

Modifications of the process and apparatus may be resorted to without departing from the spirit of the invention or the scope of the appended claims.

What is claimed is:

1. The method of shaping drum-built tire bands and inserting air bags therein which comprises supporting a tire band on one of its beads, holding an air bag in axially spaced relation to and diagonally of the central plane of the tire band, confining an air space within the tire band, forcing the beads of the tire band toward each other while simultaneously applying air pressure within the tire band to form and hold the same into tire shape, and axially forcing the air bag within the tire band so held to insert the air bag into the tire band progressively from one side thereof.

2. The process of preparing tires for vulcanization, comprising holding an unvulcanized tire in shaped form, holding an air bag in elliptical form with the plane of the bag at an angle to the plane of the tire and locating the bag with its long axis directed toward the central opening of the tire, and moving the bag into the tire and simultaneously forcing it into the plane of the tire.

3. The method of shaping drum-built tire bands and inserting air bags therein which comprises supporting a tire band on one of its beads, holding an air bag in axially spaced relation to and at an angle to the central plane of the tire band, forcing the beads of the tire band toward each other while pneumatically forming and holding the same in tire shape, and axially forcing the air bag progressively from one side thereof within the tire band while so held.

4. The method of shaping drum-built tire bands and inserting air bags therein which comprises supporting a tire band on one of its beads, holding an air bag in axially spaced relation to and diagonally of the central plane of the tire band, forcing the beads of the tire band toward each other while simultaneously applying air pressure within the tire band to form and hold the same into tire shape, and inserting the air bag into the so held tire band progressively from one side thereof.

5. The process of shaping flat band tires preparatory to vulcanization, comprising supporting a tire band by its bead portions, holding an air bag in elliptical shape with a portion of the air bag extending within the tire band, applying air pressure against the interior surfaces of the tire band while forcing the beads toward each other to form and hold the band into tire shape, and inserting the remainder of the air bag within the same in tire shape.

6. The process of shaping flat band tires preparatory to vulcanization, comprising supporting a tire band by its bead portions, holding an air bag in elliptical shape with a portion of the air bag extending within the tire band, applying air pressure against the interior surfaces of the tire band while forcing the beads toward each other to form and hold the band into tire shape, and inserting the remainder of the air bag into the tire band progressively from the said portion extending within the tire band.

7. The process of shaping flat band tires preparatory to vulcanization, comprising holding an air bag in elliptical shape with a portion thereof extending within a tire band, applying air pressure against the interior surfaces of the tire band while forcing the beads toward each other to form and hold the band into tire shape, and inserting the remainder of the air bag into the tire band while the latter is so held.

8. The process of shaping flat band tires preparatory to vulcanization, comprising holding an annular air bag in collapsed condition, positioning a tire band adjacent a portion of said air bag, applying fluid pressure internally of the tire band and forcing the beads thereof toward each other to form the band into tire shape, permitting the beads to roll freely to conform to the new shape of the tire band, diagonally thrusting a portion of the air bag into the shaped band, and restoring the annular shape of the air bag to dispose the remainder thereof circumferentially about the interior of the tire band for maintaining the latter in shaped condition.

9. The process of shaping flat band tires preparatory to vulcanization, comprising holding an annular air bag in collapsed condition, positioning a tire band about a portion of said air bag, applying fluid pressure internally of the tire band and forcing the beads thereof toward each other to form the band into tire shape, thrusting the remainder of the air bag into the shaped band, and restoring the annular shape of the air bag to dispose the same circumferentially about the interior of the tire band for maintaining the latter in shaped condition.

10. The process of shaping flat band tires preparatory to vulcanization, comprising holding an air bag in distorted condition, positioning a tire band about a portion of said air bag, applying fluid pressure internally of the tire band and forcing the beads thereof toward each other to form the band into tire shape, and thrusting the remainder of the air bag into the shaped band.

11. The process of shaping flat band tires preparatory to vulcanization, comprising holding an air bag in distorted condition, positioning a tire band about a portion of said air bag, applying fluid pressure internally of the tire band and forcing the beads thereof toward each other to form the band into tire shape, thrusting the remainder of the air bag into the shaped band, and further forcing the beads toward each other to center the air bag within the tire band.

12. Apparatus for shaping drum-built tire bands and inserting air bags therein, comprising a cylinder, a ram reciprocable in said cylinder, means on said ram for drawing an air bag into said cylinder when the ram is reciprocated therein, a flange on said cylinder for supporting a tire band on one of its beads, a plate reciprocable into engagement with the other bead of the tire band for forcing the beads toward each other and serving with the cylinder to confine fluid pressure introduced within the tire band while the beads thereof are being forced toward each other for forming the band into tire shape, means reciprocating said ram to thrust the air bag into the shaped tire band, means for further forcing the beads toward each other to center the air bag in the tire, means for evacuating said air bag and inflating the same with a non-oxidizing gas, and means for controlling and timing the operations of the apparatus with respect to each other.

13. Apparatus for shaping drum-built tire bands and inserting air bags therein, comprising a cylinder, a ram reciprocable in said cylinder, means on said ram for drawing an air bag into said cylinder when the ram is reciprocated therein, a flange on said cylinder for supporting a tire band on one of its beads, a plate reciprocable into engagement with the other bead of the tire band for forcing the beads toward each other and serving with the cylinder to confine fluid pressure introduced within the tire band while the beads thereof are being forced toward each other for forming the band into tire shape, means for reciprocating said ram to thrust the air bag into the shaped tire band, means for further forcing the beads toward each other to center the air bag in the tire, and means for controlling and timing the operations of the apparatus with respect to each other.

14. Apparatus for shaping drum-built tire bands and inserting air bags therein, comprising a cylinder, a ram reciprocable in said cylinder, means on said ram for drawing an air bag into said cylinder when the ram is reciprocated therein, a flange on said cylinder for supporting a tire band on one of its beads, a plate reciprocable into engagement with the other bead of the tire band for forcing the beads toward each other and serving with the cylinder to confine fluid pressure introduced within the tire band while the beads thereof are being forced toward each other for forming the band into tire shape, means for reciprocating said ram to thrust the air bag into the shaped tire band, and means for further forcing the beads toward each other to center the air bag in the tire.

15. Apparatus for shaping drum-built tire bands and inserting air bags therein, comprising a cylinder, a ram reciprocable in said cylinder, means on said ram for drawing an air bag into said cylinder when the ram is reciprocated therein, a flange on said cylinder for supporting a tire band on one of its beads, a plate reciprocable into engagement with the other bead of the tire band for forcing the beads toward each other and serving with the cylinder to confine fluid pressure introduced within the tire band while the beads thereof are being forced toward each other for forming the band into tire shape, means for reciprocating said ram to thrust the air bag into the shaped tire band, and means for controlling and timing the operations of the apparatus with respect to each other.

16. A machine for shaping flat band tires preparatory to vulcanizing the same, comprising a chamber, a ram reciprocable in said chamber, said ram being provided with means for drawing an air bag within the chamber, means for supporting a tire band in alignment with the chamber, a plate engageable with said tire band, said chamber, tire band and plate defining a closed container, means for admitting fluid pressure into said container, means for moving the plate for forcing the margins of the tire band toward each other to form the band into tire shape, and means for moving said ram to transfer the air bag into the tire shaped band.

17. A machine for shaping flat band tires preparatory to vulcanizing the same, comprising a chamber, means in said chamber for supporting an air bag therein diagonally of the axis of the chamber, means for supporting a tire band at one side of and in axial alignment with the chamber, a plate engageable with said tire band, said chamber, tire band and plate defining a closed container, means for admitting fluid pressure into said container, means for moving the plate for forcing the margins of the tire band toward each other, and means for transferring the air bag from the chamber into the tire shaped band.

18. A machine for shaping flat band tires preparatory to vulcanizing the same, comprising a chamber, means for drawing an air bag within said chamber, means for supporting a tire band at one side of the chamber, means for distending the walls of the tire band, means for moving the margins of the tire band toward each other, and means for transferring the air bag from the chamber into the tire.

19. The method of shaping a tire band and inserting an annular pressure bag therein comprising forming and holding an air bag in elliptical form and applying differential pressure to the opposite side of the tire band with the pressure bag and band in such arrangement that the long axis of the pressure bag is directed toward the inside of the band, and progressively introducing the bag within the band while the band is held in distended condition.

20. The method of shaping a tire band and inserting an annular pressure bag therein which comprises drawing the pressure bag into elongated form and holding the same in said form, applying differential pressures to the opposite faces of the band to distend the same, moving the bag into the band progressively from one side thereof, and releasing the bag when in register with the interior of the tire.

21. The method of shaping a tire band and inserting an annular pressure bag therein comprising drawing the pressure bag into elongated form and applying differential pressures to the opposite faces of the band to distend the same with the band and bag so arranged that the latter is in a plane diverging from the plane of the tire and with the plane of the bag directed toward the shaped tire, and moving the bag into the shaped tire.

22. The method of shaping a tire band and inserting an annular pressure bag therein comprising drawing said pressure bag into elongated form, bringing the band to tire shape with the interior thereof unobstructed, and introducing the pressure bag into the shaped tire by progressive movement.

23. The method of shaping a tire band and inserting an annular pressure bag therein comprising drawing the bag into elongated form, bringing the band to approximately tire shape with the interior thereof unobstructed, introducing the bag into the shaped tire by progressive movement, and introducing a fluid under pressure into the bag to cause it to expand into the tire.

24. A method for shaping tire bands and inserting an annular pressure bag therein comprising changing a pressure bag from its circular form to elliptical form, altering the tire from its band form to approximately tire shape with its interior unobstructed, said bag being positioned with the long axis thereof directed toward the shaped tire, then introducing the bag into the tire by moving it into the unobstructed interior of the tire, bringing the bag in alignment with the tire, and releasing the bag to permit it to assume a position within the interior of the tire.

25. A method for shaping tire bands and inserting an annular pressure bag therein comprising changing a pressure bag from its circular form to elliptical form, altering the tire from its band form to approximately tire shape with its interior unobstructed, said pressure bag being positioned with the long axis thereof directed toward the shaped tire, then introducing the bag into the tire by moving it into the unobstructed interior of the tire, bringing the bag in alignment with the tire, introducing a fluid medium under pressure into the bag, and releasing the bag to permit it to assume a position within the interior of the tire.

26. An apparatus for shaping tire bands and inserting an annular pressure bag therein comprising means for bringing the tire from band form to approximately tire form and holding it in such position with the interior thereof unobstructed, a pressure bag holder associated with said means whereby its mouth registers with the central opening of the tire formed and held by said means, pressure bag engaging means movable from the mouth of the holder to a point within the holder and having means to engage the pressure bag at one point, and means to reciprocate the pressure bag engaging means whereby the bag is reduced to elliptical form in the holder and discharged therefrom, and means to introduce a fluid medium under pressure into the bag during the operation.

27. An apparatus for shaping tire bands and inserting an annular pressure bag therein comprising means for bringing the tire from band form to approximately tire form and holding it in such position with the interior thereof unobstructed, a pressure bag holder associated with said means whereby its mouth registers with the central opening of the tire formed and held by said means, pressure bag engaging means movable from the mouth of the holder to a point within the holder and having means to engage the bag at one point, and means to reciprocate the pressure bag engaging means whereby the bag is reduced to elliptical form in the holder and discharged therefrom, and means to evacuate and introduce a fluid under pressure into the bag during the operation.

28. An apparatus for shaping tire bands and inserting an annular pressure bag therein comprising means for bringing the tire from band form to approximately tire form and holding it in such position with the interior thereof open at one side thereof, a plate to close the other side of the tire, a pressure bag holder associated with said means whereby its mouth registers with the central opening of a tire formed and held by said means, bag engaging means movable from the mouth of the holder to a point within the holder and having means to engage the bag at one point, and means to reciprocate the pressure bag engaging means whereby the bag is reduced to elliptical form in the holder and discharged therefrom against the plate.

29. An apparatus for shaping tire bands and inserting an annular pressure bag therein comprising means for bringing the tire from band form to approximately tire form and holding it in such position with the interior thereof open at one side thereof, a plate to close the other side of the tire, a pressure bag holder associated with said means whereby its mouth registers with the central opening of a tire formed and held by said means, pressure bag engaging means movable from the mouth of the holder to a point within the holder and having means to engage the bag at one point, and means to reciprocate the pressure bag engaging means whereby the bag is reduced to elliptical form in the holder and discharged therefrom, and means to introduce a fluid under pressure into the bag during the operation against the plate.

30. An apparatus for shaping tire bands and inserting an annular pressure bag therein comprising means for bringing the tire from band form to approximately tire form and holding it in such position with the interior thereof open at one side thereof, a plate to close the other side of the tire, a pressure bag holder associated with said means whereby its mouth registers with the central opening of a tire formed and held by said means, bag engaging means movable from the mouth of the holder to a point within the holder and having means to engage the bag at one point, and means to reciprocate the pressure bag engaging means whereby the bag is reduced to elliptical form in the holder and discharged therefrom, and means to evacuate and introduce a fluid medium under pressure into the bag during the operation against the plate.

31. An apparatus for shaping tire bands and inserting an annular pressure bag therein comprising means for bringing the tire from band form to approximately tire form and holding it in such position with the interior thereof unobstructed, a pressure bag holder associated with said means whereby its mouth registers with the central opening of the tire formed and held by said means, pressure bag engaging means movable from the mouth of the holder to a point within the holder and having means to engage the bag at one point, and means to reciprocate the pressure bag engaging means whereby the bag is reduced to elliptical form in the holder and discharged therefrom.

32. A tire shaping machine comprising a member for engaging an edge of a tire band, means for engaging another edge of a tire band, means for applying a differential pressure between the surfaces of said band, means insertable through and withdrawable from one of said members for distorting an air bag, and a fluid tight housing for at least a portion of said manipulating means, the interior of said housing being in communication with the outer surface of the member through which the manipulating means moves.

33. The method of placing a circular inflatable former in a pneumatic tire, which consists in elongating the former, and inserting the elongated former end-first into the tire.

34. The method of placing a circular inflatable former in a pneumatic tire, which consists in elongating the former sufficiently to give it a width less than the bead diameter of the tire, placing one end of the elongated former into the tire at some point in its periphery, and progressively moving the former into the tire by permitting the former to return to circular shape as it is gradually inserted within the tire.

35. The method of placing a circular inflatable former in a pneumatic tire, which consists in holding the tire on a support, elongating the former sufficiently to give it a width less than the bead diameter of the tire, and moving the elongated former gradually into the tire in an endwise direction, that portion of the former which enters the tire being allowed progressively as it enters to resume its circular shape therein, while the trailing or uninserted portion of the former is maintained in elongated condition until it finally enters the tire and is then allowed to return to circular shape.

36. The method of placing an inflatable former within a tire, which consists in holding the tire on a support, moving the former into a shaping chamber at one side of the tire, whereby to elongate the said former sufficiently to give it a width less than the bead diameter of the tire, and moving the elongated former end first from the chamber and into the tire, while permitting the side portions of said former progressively to return to their normal circular shape as they enter the tire.

37. A method according to claim 33, characterized by the fact that the inflatable former is slightly inflated after it has been given its elongate shape but before it is moved into the tire.

38. A machine of the class described comprising means for supporting a tire, and means for placing an inflatable former within the supported tire from one side thereof, the latter means being operable initially to convert said former from circular to elongated shape and of a width less than the bead diameter of the tire.

39. A machine of the class described comprising means for supporting a tire, and means for distorting an inflatable former from circular to elongated shape at one side of the tire, and introducing said former endwise into the tire while permitting it progressively to return to its original circular shape therein.

40. A machine of the class described comprising means for supporting a tire, a holder for an inflatable former disposed at one side of the tire supporting means, said holder being of a width less than the bead diameter of the tire, whereby to distort said former from circular to elongated shape, and means for moving said former into the holder and subsequently expelling it therefrom into the tire.

41. A machine according to claim 39, including means for inflating the inflatable former after it has been given elongate shape but before it is moved into the tire.

42. A machine of the class described comprising means for giving shape to a tire made in pulley-band form, and cooperating means for placing an inflatable former within the shaped tire, the latter means being operable initially to distort said former from circular to elongate shape.

43. A machine of the class described comprising means for giving shape to a tire made in pulley-band form, and means for placing an inflatable former within the shaped tire, the latter means including a holder for said former of a width less than the bead diameter of the tire, and devices for moving the inflatable former into said holder to elongate it therein and for subsequently expelling it therefrom as elongated into the tire.

44. A machine of the class described comprising a fixed platen and a movable platen adapted to cooperate in giving shape to a tire made in pulley-band form, a sealed holder disposed outside the fixed platen for receiving a circular inflatable former, said holder being of a width less than the bead diameter of the tire so as to impart to said former an elongated shape, and said holder communicating at one end with a pressure chamber defined between the opposed platens and within the tire, means for moving the inflatable former into the holder to elongate it and for subsequently expelling it therefrom into the shaped tire, and means for supplying pressure fluid to said pressure chamber to cooperate with the platens in shaping the tire.

45. A machine according to claim 39, including means for inflating the inflatable former after it has been given elongate shape but before it is moved into the tire characterized by the fact that said inflating means are controlled automatically at the proper time in the operation of the machine.

GEORGE B. NICHOLS.